US011539924B2

(12) United States Patent
Lobbes et al.

(10) Patent No.: US 11,539,924 B2
(45) Date of Patent: Dec. 27, 2022

(54) MULTIPLE PROJECTOR-ENABLED CONTENT TARGETING USING DIFFRACTION GRATING

(71) Applicant: Kyndryl, Inc., New York, NY (US)

(72) Inventors: Matthew Mitchell Lobbes, Northlake, TX (US); Nathaniel J. Gibbs, Iowa City, IA (US); Brian James Snitzer, Lancaster, PA (US); Mike Treadway, Keller, TX (US)

(73) Assignee: Kyndryl, Inc., New York, NY (US)

( * ) Notice: Subject to any disclaimer, the term of this patent is extended or adjusted under 35 U.S.C. 154(b) by 189 days.

(21) Appl. No.: 17/102,622

(22) Filed: Nov. 24, 2020

(65) Prior Publication Data

US 2022/0166960 A1    May 26, 2022

(51) Int. Cl.
*H04N 9/31* (2006.01)
*G02B 27/42* (2006.01)
*G03B 21/26* (2006.01)

(52) U.S. Cl.
CPC ....... *H04N 9/3147* (2013.01); *G02B 27/4205* (2013.01); *G03B 21/26* (2013.01); *H04N 9/3182* (2013.01)

(58) Field of Classification Search
None
See application file for complete search history.

(56) References Cited

U.S. PATENT DOCUMENTS

| 6,334,109 | B1 | 12/2001 | Kanevsky et al. |
| 6,763,148 | B1 | 7/2004 | Sternberg et al. |
| 7,203,346 | B2 | 4/2007 | Kim et al. |
| 7,643,671 | B2 | 1/2010 | Dong et al. |

(Continued)

FOREIGN PATENT DOCUMENTS

| CN | 105654852 A | 6/2016 |
| EP | 2541481 A1 | 1/2013 |
| JP | 2000321674 A | * 11/2000 |

OTHER PUBLICATIONS

Gibbs et al., "Dynamic Visual Display Targeting Using Diffraction Grating," U.S. Appl. No. 16/699,672, filed Dec. 1, 2019, 30 pages.

(Continued)

*Primary Examiner* — Bao-Luan Q Le
*Assistant Examiner* — Danell L Owens
(74) *Attorney, Agent, or Firm* — Yee & Associates, P.C.

(57) ABSTRACT

Multiple projector-enabled content targeting using diffraction grating is provided. A projector of a plurality of projectors in a display device is selected to project a particular color of a plurality of different colors at a predefined intensity to a content slot in a set of content slots via a corresponding diffraction grating to provide different content in full color images to respective viewers of a set of viewers at different viewing angles relative to the display device simultaneously. The different content is projected in the full color images to the respective viewers at the different viewing angles simultaneously using each particular projector of the plurality of projectors to project its particular color of the plurality of different colors at the predefined intensity to each particular content slot of the set of content slots via each corresponding diffraction grating.

20 Claims, 7 Drawing Sheets

(56) References Cited

U.S. PATENT DOCUMENTS

| | | | |
|---|---|---|---|
| 8,224,108 | B2 | 7/2012 | Steinberg et al. |
| 9,639,740 | B2 | 5/2017 | Ganong et al. |
| 2013/0104080 | A1 | 4/2013 | Bosworth et al. |
| 2018/0217490 | A1* | 8/2018 | Shin ................... G03B 35/20 |
| 2019/0019218 | A1* | 1/2019 | Thompson ........... H04N 13/398 |
| 2019/0101795 | A1 | 4/2019 | Tan |
| 2020/0092538 | A1 | 3/2020 | Kaehler |
| 2020/0150322 | A1 | 5/2020 | Lin |

OTHER PUBLICATIONS

"Which is the best technique to locate objects in an image?," Quora Inc., copyright 2020, accessed Oct. 27, 2020, 2 pages. https://www.quora.com/Which-is-the-best-technique-to-locate-objects-in-an-image.

Genxium, "[Lab]difference between diffraction grating and linear polarizer?," Nov. 4, 2012, Physics Forums, copyright 2001-2020, accessed Oct. 27, 2020, 4 pages. https://www.physicsforums.com/threads/lab-difference-between-diffraction-grating-and-linear-polarizer.649669/.

Reddit, "ELI5: Why are linear polarizers and diffraction gratings not interchangeable?," accessed Oct. 27, 2020, 7 pages. https://www.reddit.com/r/Physics/comments/7gw1o2/eli5_why_are_linear_polarizers_and_diffraction/.

Wikipedia, "Diffraction grating," last edited Oct. 25, 2020, Wikimedia Foundation Inc., accessed Oct. 27, 2020, 6 pages. https://en.wikipedia.org/wiki/Diffraction_grating.

"Diffraction Grating," CK12, accessed Oct. 27, 2020, 4 pages. https://www.ck12.org/physics/diffraction-gratings/lesson/Diffraction-Gratings-PHYS/.

Yudkowsky, "Feynman Paths," Apr. 17, 2008, LessWrong, accessed Oct. 27, 2020, 7 pages. https://www.lesswrong.com/posts/oiu7YhzrDTvCxMhdS/feynman-paths.

Cooper, "Waves Interference Diffraction Grating," Visual Physics Online, accessed on Wayback Machine Internet Archive Oct. 29, 2020, 9 pages. http://www.physics.usyd.edu.au/teach_res/hsp/sp/mod31/m31_Grating.htm.

* cited by examiner

```
CONTENT_SLOTS = []
VIEWERS = []
DISTANCE_BEWEEN_SLITS =
onIdentifyViewer(viewer) {
  VIEWERS.add(v);
}
onViewerOutOfSite(viewer) {
  VIEWERS.remove(v);
  for( i = 0; i < CONTENT_SLOTS.length; i++){
    untargetContent( i, viewer);
  }
}
poll() {
  for (viewer in VIEWERS) {
    angle = viewer.obtainAngle();
    if (angle > 90)
      angle = 180 - angle;
    slot = floor((angle / 90) * (CONTENT_SLOTS.length - 1));
    for ( i = 0; i < CONTENT_SLOTS.length; i++) {
      if (i == slot) {
        targetContent(slot, viewer, angle);
      } else {
        untargetConent(i, viewer, angle);
      }
    }
  }
}
targetContent(slotNum, viewer, angle) {
  slot = CONTENT_SLOTS[slotNum];
  if (slot.viewers.empty()) {
    slot.content = selectContent(viewer);
  }
  slot.viewers.add(viewer);
  projectors = getProjectors(slot);
  projectors.red.displayOn(content, "red");
  projectors.blue.displayOn(content, "blue");
  projectors.green.displayOn(content, "green");
}
untargetContent(slotNum, viewer) {
  slot = CONTENT_SLOTS[slotNum];
  slot.viewers.remove(viewer);
  projectors = getProjectors(slot);
  projectors.red.displayOff(content, "red");
  projectors.blue.displayOff(content, "blue");
  projectors.green.displayOff(content, "green");
}
getProjectors(slot) {
  // Assumes dedicated projector for each color and slot
  // Other embodiments may reuse projectors across slots and colors
  return {
    red: slot.red.projector,
    blue: slot.blue.projector,
    green: slot.green.projector
  }
}
```

CONTENT PROJECTION ALGORITHM 500

MULTIPLE PROJECTOR-ENABLED CONTENT TARGETING USING DIFFRACTION GRATING

BACKGROUND

1. Field

The disclosure relates generally to diffraction grating and more specifically to simultaneously projecting targeted content to a plurality of different viewers at a plurality of different viewing angles relative to a display device comprising a plurality of projectors and a plurality of corresponding diffraction gratings.

2. Description of the Related Art

A diffraction grating is an optical component with a periodic structure that splits and diffracts light into several beams traveling in different directions. The directions of these beams depend on the spacing of the diffraction grating and the wavelength of the light so that the diffraction grating acts as a dispersive element. Diffraction gratings generally have ridges or rulings on their surface rather than dark lines. Diffraction gratings can be either transmissive or reflective, and diffraction gratings that modulate the phase rather than the amplitude of the incident light are also produced using holography.

Diffraction grating can create multiple colors when illuminated in a wide spectrum (e.g., continuous) light source. The sparking effects from closely spaced narrow tracks on optical storage mediums are an example of interference effects in reflections from the closely spaced transmissive layers. Generally, a diffraction grating has parallel lines, and diffraction colors appear when a viewer looks at a bright point source through a translucent covering.

Conventionally, positioning refers to the place that an image occupies in the mind of a viewer and how it is distinguished from information provided by different information providers. However, positioning of displays differs from the conventional definition of positioning. Generally, positioning of displays is used to display different forms of information. These different forms of information may include products, services, communications, directions, locations, and the like.

SUMMARY

According to one illustrative embodiment, a computer-implemented method for multiple projector-enabled content targeting using diffraction grating is provided. A computer selects a particular projector of a plurality of projectors in a display device to project a particular color of a plurality of different colors at a predefined intensity to a particular content slot in a selected set of content slots via a corresponding diffraction grating to provide different content in full color images to respective viewers of a set of viewers at different viewing angles relative to the display device simultaneously. The computer projects the different content in the full color images to the respective viewers at the different viewing angles simultaneously using each particular projector of the plurality of projects to project its particular color of the plurality of different colors at the predefined intensity to each particular content slot of the selected set of content slots via each corresponding diffraction grating. According to other illustrative embodiments, a computer system and computer program product for multiple projector-enabled content targeting using diffraction grating are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
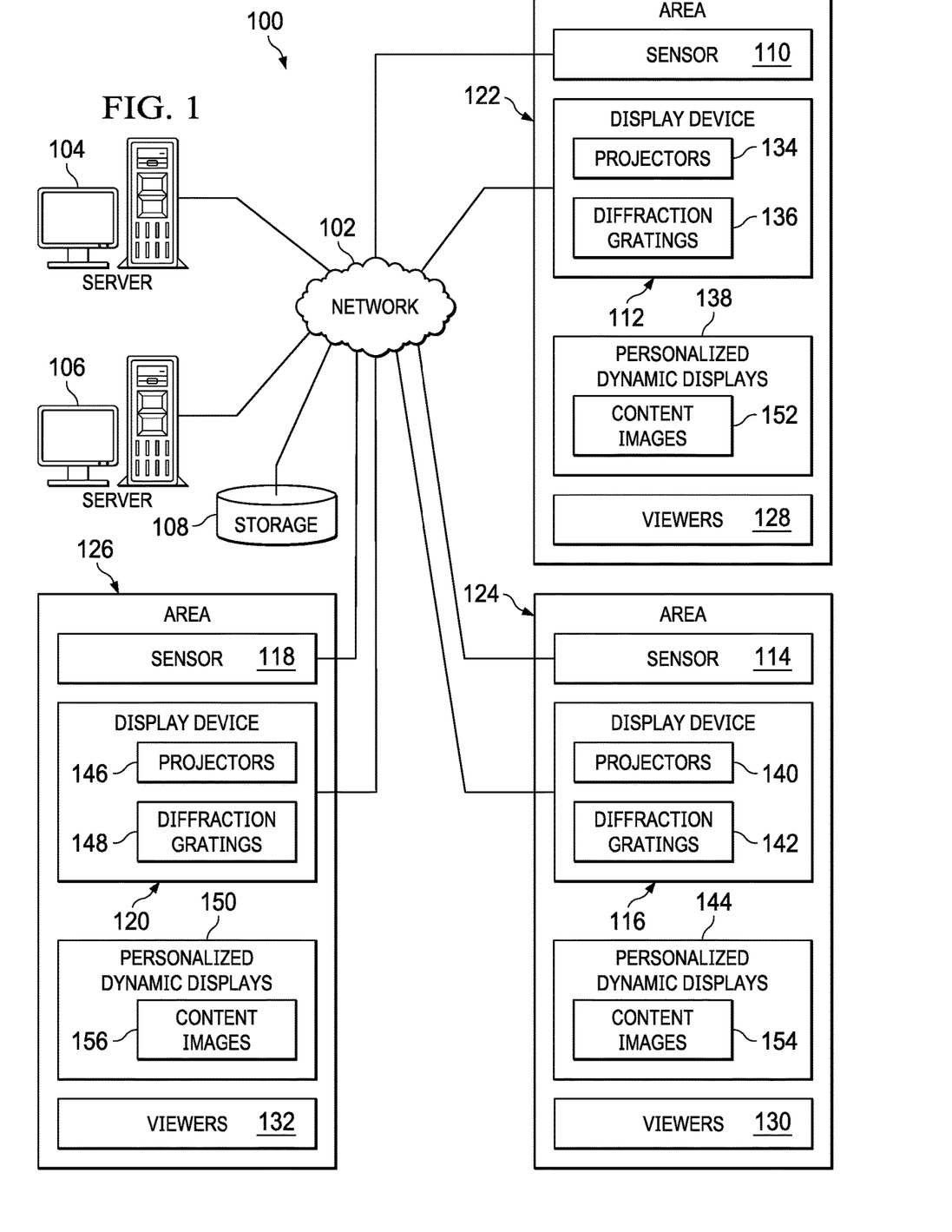
FIG. 1 is a pictorial representation of a network of data processing systems in which illustrative embodiments may be implemented.
Figure 2:
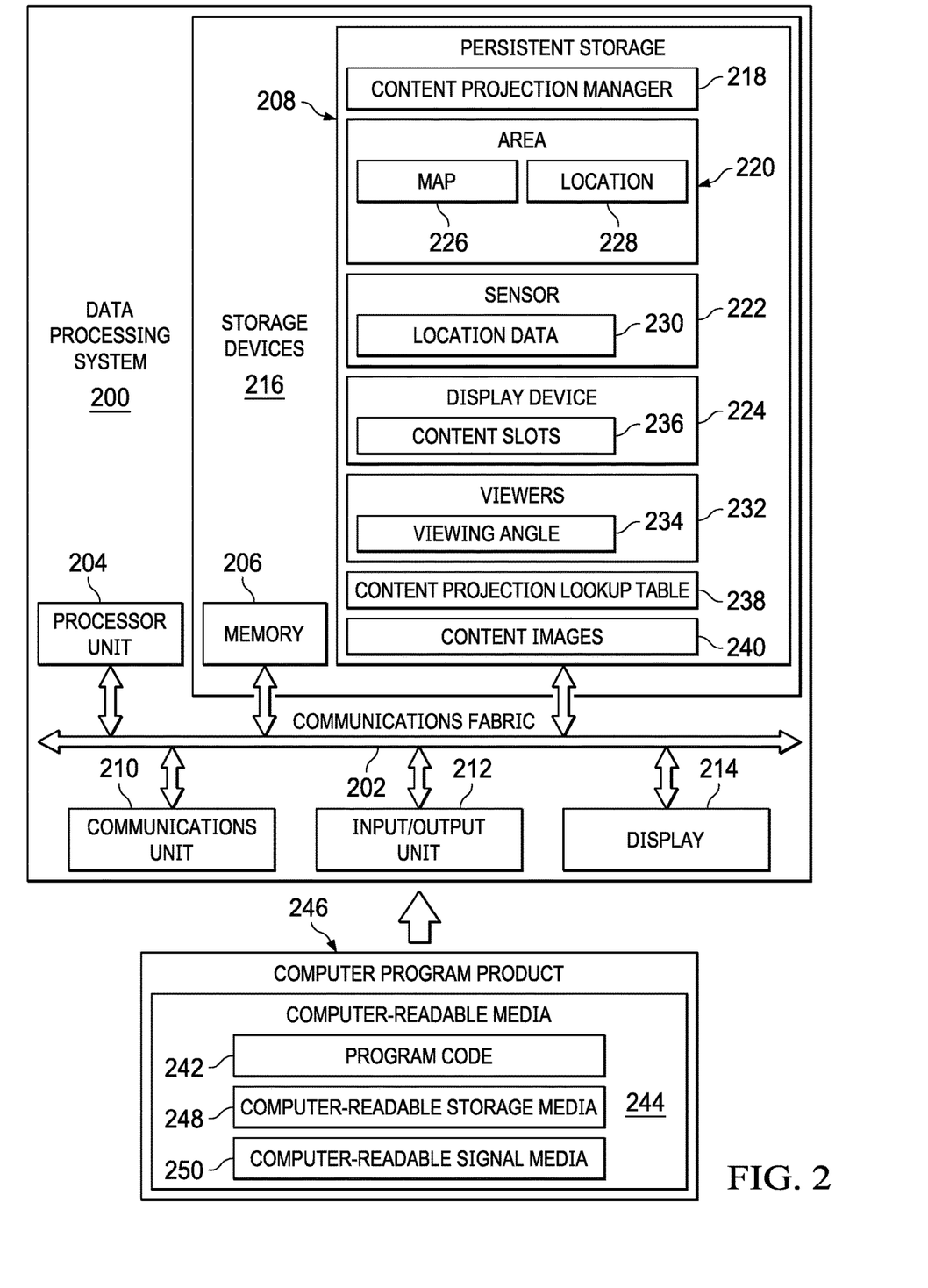
FIG. 2 is a diagram of a data processing system in which illustrative embodiments may be implemented.
Figure 3:
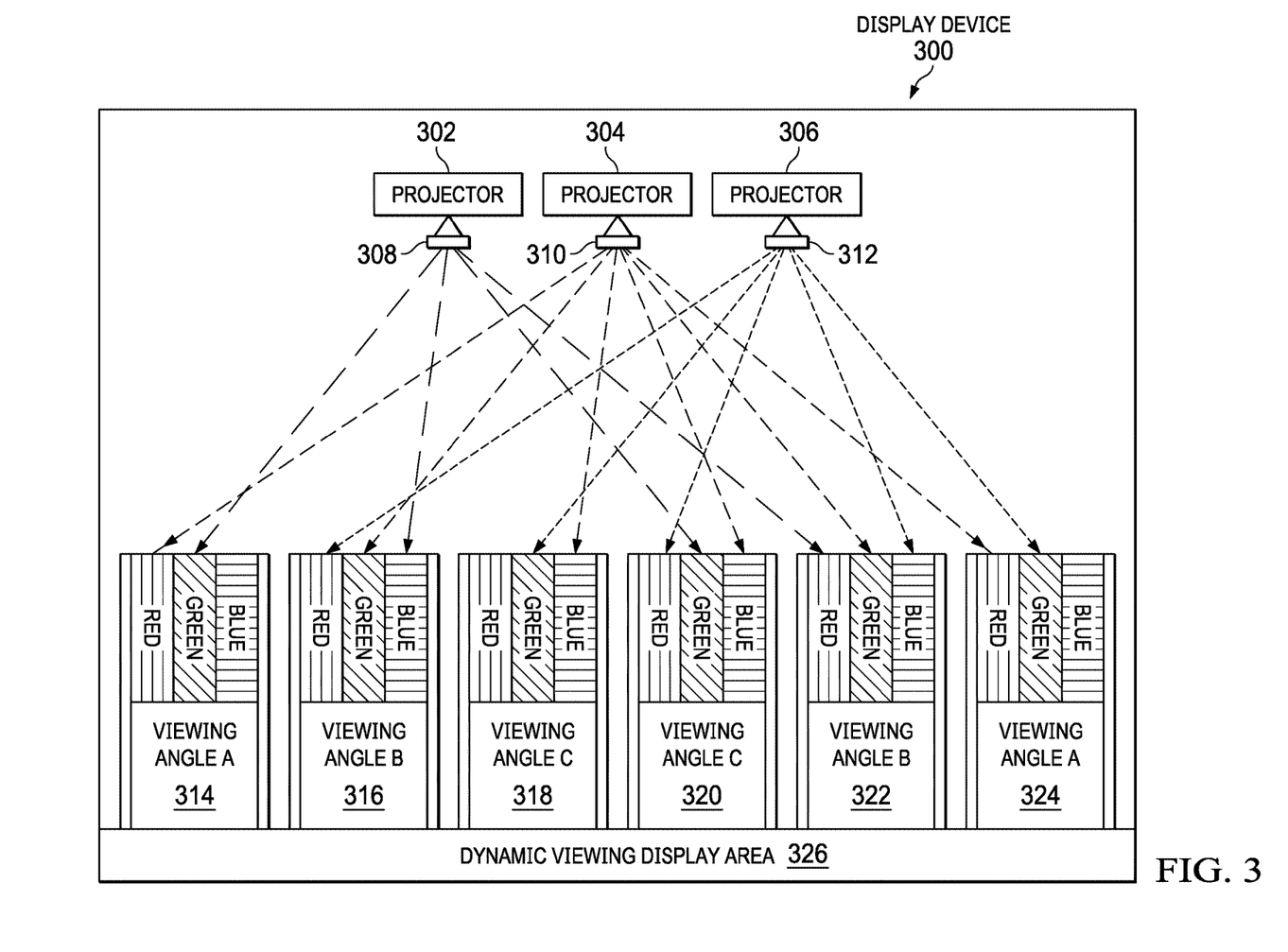
FIG. 3 is a diagram illustrating an example of a display device in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, sensors, display devices, and other devices in which the illustrative embodiments may be implemented. Network data processing system 100 contains network 102, which is the medium used to provide communications links between the computers, data processing systems, sensors, display devices, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide content projection management services to client display devices corresponding to subscribing entities, such as, for example, stores, businesses, companies, enterprises, organizations, institutions, agencies, groups, individuals, and the like. Also, it should be noted that server 104 and server 106 may each represent a cluster of servers in one or more data centers. Alternatively, server 104 and server 106 may each represent multiple computing nodes in one or more cloud environments. Further, server 104 and server 106 may provide information, such as, for example, applications, programs, updates, fixes, files, data, and the like to client display devices and sensors.

Sensor 110, display device 112, sensor 114, display device 116, sensor 118, and display device 120 also connect to network 102. Sensor 110, display device 112, sensor 114, display device 116, sensor 118, and display device 120 are client devices of server 104 and server 106. Sensor 110, display device 112, sensor 114, display device 116, sensor 118, and display device 120 may utilize wire and wireless communication links to network 102 to send data to and receive information and instructions from server 104 and server 106.

In this example, sensor 110 and display device 112 are located in area 122, sensor 114 and display device 116 are located in area 124, and sensor 118 and display device 120 are located in area 126. Area 122, area 124, and area 126 may represent any type of space or place, such as, for example, a room, store, office, mall, restaurant, theater, museum, bank, amusement park, sidewalk, roadway, airport, terminal, station, or the like, which is owned and operated by a subscribing entity to the content projection management services provided by server 104 and server 106.

Sensor 110, sensor 114, and sensor 118 each represents a set of sensors. A set of sensors may include, for example, one or more imaging sensors, such as one or more video cameras, still picture cameras, infrared cameras, and the like. However, the set of sensors may also include other types of sensors, such as, for example, motion sensors, thermal sensors, sound sensors, and the like. Server 104 and server 106 utilize sensor 110, sensor 114, and sensor 118 to monitor the environment of area 122, area 124, and area 126, respectively. Specifically, server 104 and server 106 utilize sensor 110 to detect and transmit location data regarding viewers 128 in area 122 relative to display device 112, sensor 114 to detect and transmit location data regarding viewers 130 in area 124 relative to display device 116, and sensor 118 to detect and transmit location data regarding viewers 132 in area 126 relative to display device 120.

Viewers 128, viewers 130, and viewers 132 each represents a plurality of different people moving in area 122, area 124, and area 126, respectively. Viewers 128, viewers 130, and viewers 132 are targets of specific content projected by display device 112, display device 116, and display device 120, respectively. Server 104 and server 106 direct display device 112, display device 116, and display device 120 to project the specified content based on determined viewing angles of each respective viewer in viewers 128, viewers 130, and viewers 132 relative to display device 112, display device 116, and display device 120 using the received viewer location data received from sensor 110, sensor 114, and sensor 118. Display device 112, display device 116, and display device 120 may represent any type of display device, such as, for example, a large screen television, electronic billboard, monitor, or the like.

Display device 112 includes projectors 134 and diffraction gratings 136. Display device 116 includes projectors 140 and diffraction gratings 142. Display device 120 includes projectors 146 and diffraction gratings 148. Projectors 134, projectors 140, and projectors 146 each represents a plurality of light projectors, such as, for example, 3 light projectors. Display device 112, display device 116, and display device 120 utilize projectors 134, projectors 140, and projectors 146 to project light comprising images of specific content.

Diffraction gratings 136, diffraction gratings 142, and diffraction gratings 148 each represents a plurality of diffraction gratings, such as, for example, 3 diffraction gratings. Diffraction gratings 136, diffraction gratings 142, and diffraction gratings 148 correspond to projectors 134, projectors 140, and projectors 146, respectively. In other words, each respective diffraction grating in diffraction gratings 136, diffraction gratings 142, and diffraction gratings 148 corresponds to a particular projector in projectors 134, projectors 140, and projectors 146. Thus, a one-to-one relationship exists between diffraction gratings 136, diffraction gratings 142, and diffraction gratings 148 and projectors 134, projectors 140, and projectors 146.

Diffraction gratings 136, diffraction gratings 142, and diffraction gratings 148 diffract or divert different light wavelengths (i.e., different colors) projected by projectors 134, projectors 140, and projectors 146 to different content slots corresponding to personalized dynamic displays 138, personalized dynamic displays 144, and personalized dynamic displays 150, which provide content images 152, content images 154, and content images 156 in full color (e.g., a red, green, and blue color mixture) to each respective viewer in viewers 128, viewers 130, and viewers 132 based on respective viewing angles of viewers 128, viewers 130, and viewers 132 relative to display device 112, display device 116, and display device 120. In other words, viewers 128, viewers 130, and viewers 132 see content images 152, content images 154, and content images 156 as light projected by projectors 134, projectors 140, and projectors 146 via corresponding diffraction gratings 136, diffraction gratings 142, and diffraction gratings 148 based on an angle towards a particular location of viewers 128, viewers 130, and viewers 132 relative to display device 112, display device 116, and display device 120. For example, viewer "A" standing at 25 degrees relative to display device 112 may correspond to content slot "A" comprising personalized dynamic display "A" that displays content image "A" and viewer "B" standing at 35 degrees relative to display device 112 may correspond to content slot "B" comprising personalized dynamic display "B" that displays content image "B". Content images 152, content images 154, and content images 156 may include, for example, text, graphics, pictures, videos, signs, symbols, special characters, emojis, maps, diagrams, animations, and the like.

Storage 108 is a network storage device capable of storing any type of data in a structured format or an unstructured format. In addition, storage 108 may represent a plurality of network storage devices. Further, storage 108 may store identifiers and network addresses for a plurality of different client sensors and display devices, identifiers for a plurality of different viewers, a plurality of different viewer profiles, a plurality of different content images, content projection lookup tables, area maps, and the like. Furthermore, storage 108 may store other types of data, such as authentication or credential data that may include user names, passwords, and biometric data associated with system administrators, for example.

In addition, it should be noted that network data processing system 100 may include any number of additional servers, sensors, display devices, storage devices, and other devices not shown. Program code located in network data processing system 100 may be stored on a computer readable storage medium and downloaded to a computer or other data processing device for use. For example, program code may be stored on a computer readable storage medium on server 104 and downloaded to display device 112 over network 102 for use on display device 112.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks.

Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as server 104 in FIG. 1, in which computer readable program code or instructions implementing the content projection management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores content projection manager 218. However, it should be noted that even though content projection manager 218 is illustrated as residing in persistent storage 208, in an alternative illustrative embodiment content projection manager 218 may be a separate component of data processing system 200. For example, content projection manager 218 may be a hardware component coupled to communication fabric 202 or a combination of hardware and software components. In another alternative illustrative embodiment, a first set of components of content projection manager 218 may be located in data processing system 200 and a second set of components of content projection manager 218 may be located in a second data processing system, such as, for example, server 106 in FIG. 1. In yet another alternative illustrative embodiment, content projection manager 218 may be located in a display device, such as, for example, display device 112 in FIG. 1, in addition to, or instead of, data processing system 200.

Content projection manager 218 controls the process of simultaneously projecting targeted content to a plurality of different viewers at a plurality of different viewing angles relative to a display device. Area 220 represents an identifier of a particular area, such as, for example, area 122 in FIG. 1. Sensor 222 and display device 224 represent unique identifiers for a sensor and a display device, such as, for example, sensor 110 and display device 112 in FIG. 1, which correspond to area 220. Display device 224 comprises a plurality of projectors and a plurality of corresponding diffraction gratings, such as, for example, projectors 134 and diffraction gratings 136 in FIG. 1.

Map 226 represents, for example, a digital twin of area 220. Content projection manager 218 utilizes map 226 to identify location 228 of sensor 222 and display device 224 within area 220.

Content projection manager 218 receives location data 230 regarding viewers 232 moving in area 220 from sensor 222. Viewers 232 represent identifiers for a plurality of different viewers in area 220 and may be, for example, viewers 128 in FIG. 1. Location data 230 identify a current real time position of each respective viewer of viewers 232 within area 220. Content projection manager 218 utilizes location data 230 corresponding to viewers 232 to determine viewing angle 234 of each respective viewer in relation to display device 224 based on location 228 of display device 224 within area 220.

Content projection manager 218 logically divides a dynamic viewing display area of display device 224 into content slots 236. Content slots 236 represent unique identifiers for a plurality of different locations to which different full color content images are projected to different viewers of viewers 232. Content projection manager 218 utilizes content projection lookup table 238 to determine which projector of the plurality of projects in display device 224 is to project a particular color of a plurality of different colors to a particular content slot of content slots 236 to produce content images 240 in full color. Content images 240 represent images of a plurality of different content. Each content image of content images 240 may be viewed by a particular viewer of viewers 232 based on viewing angle 234 of each respective viewer. Content images 240 may be, for example, content images 152 in FIG. 1.

As a result, data processing system 200 operates as a special purpose computer system in which content projection manager 218 in data processing system 200 enables simultaneous projection of multiple different content in full color to each of a plurality of different viewers based on a respective viewing angle of each viewer relative to a display device comprising a plurality of projectors with corresponding diffraction gratings. In particular, content projection manager 218 transforms data processing system 200 into a special purpose computer system as compared to currently available general computer systems that do not have content projection manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 242 is located in a functional form on computer readable media 244 that is selectively removable and may be loaded onto or transferred to data processing system 200 for running by processor unit 204. Program code 242 and computer readable media 244 form computer program product 246. In one example, computer readable media 244 may be computer readable storage media 248 or computer readable signal media 250.

In these illustrative examples, computer readable storage media 248 is a physical or tangible storage device used to store program code 242 rather than a medium that propagates or transmits program code 242. Computer readable storage media 248 may include, for example, an optical or magnetic disc that is inserted or placed into a drive or other device that is part of persistent storage 208 for transfer onto a storage device, such as a hard drive, that is part of persistent storage 208. Computer readable storage media 248 also may take the form of a persistent storage, such as a hard drive, a thumb drive, or a flash memory that is connected to data processing system 200.

Alternatively, program code 242 may be transferred to data processing system 200 using computer readable signal media 250. Computer readable signal media 250 may be, for example, a propagated data signal containing program code 242. For example, computer readable signal media 250 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 244" can be singular or plural. For example, program code 242 can be located in computer readable media 244 in the form of a single storage device or system. In another example, program code 242 can be located in computer readable media 244 that is distributed in multiple data processing systems. In other words, some instructions in program code 242 can be located in one data processing system while other instructions in program code 242 can be located in one or more other data processing systems. For example, a portion of program code 242 can be located in computer readable media 244 in a server computer while another portion of program code 242 can be located in computer readable media 244 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 242.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Illustrative embodiments take into account that a need exists for providing different full color content images to multiple different viewers in different environments using diffraction grating technology. The content images may be, for example, location-based information, content-based information, directional information, product information, service information, entertainment information, language information, and the like. Current display technologies are only capable of displaying a different image to a viewer depending on where the viewer is located in relation to the display device, such as a billboard capable of displaying a different image to a different individual depending on the location and angle of the viewer. Illustrative embodiments are capable of providing specific content images simultaneously via multiple wavelengths to multiple viewers depending on each view's location using diffraction grating technology.

Illustrative embodiments utilize multiple image projectors, each image projector provides a different light wavelength (i.e., particular color) to an individual viewer at a particular viewing angle relative to a display device. While utilizing multiple image projectors preserves an ability to display multiple different content images to different viewers at different viewing angles, utilizing multiple image projectors also improves the viewers' experience by enabling each of those content images to be shown in full color at any viewing angle relative to the display device as the viewers move in the area corresponding to the display device. As a result, illustrative embodiments prevent the disconcerting viewer experience of seeing content images change color as a viewer moves from one viewing angle to another.

Illustrative embodiments determine an amount of each color the projectors are to project at a given viewing angle to enable a specific content image in full color. In other words, illustrative embodiments, utilizing a content projection lookup table, identify which image projector of a plurality of image projectors (e.g., three image projectors) will project a particular color for a particular viewing angle relative to the display device to generate a different specific full color content image at each different viewing angle. Illustrative embodiments, based on the information in the content projection lookup table, send instructions to each image projector of the plurality of image projectors so that the plurality of image projectors sustain what appears to a viewer as a consistent overall mix of colors reaching the viewers eyes.

Consequently, illustrative embodiments may be utilized in many different environments and locations. For example, in a gaming application, each player looks at the screen and is given information on each player's "character" in the game. As the game progresses, each player can look at the screen from each player's respective viewing angle and receive specific individualized information and updates corresponding to each respective player's character in the game from illustrative embodiments in full color. As another example, at a music venue, illustrative embodiments can project different content images to different sections of the audience using a screen behind a performer on stage.

Illustrative embodiments can also provide non-targeted content to viewers. For example, if a viewer is walking from a particular direction (e.g., southerly direction), then illustrative embodiments may project a logo of and an arrow directing the viewer to a nearby shoe store, whereas a different viewer walking from a different direction (e.g., northerly direction) may see a logo of and an arrow directing the other viewer to a nearby restaurant. Similarly, illustrative embodiments may project specific navigational directions to viewers while driving, biking, or the like around a city. For example, illustrative embodiments can project to drivers in a left lane "Accident on off ramp 0.5 miles ahead", while projecting to drivers in a middle lane "This lane closed 1 mile ahead, merge right" and to drivers in a right lane "Reduce speed and watch for merging traffic".

Further, illustrative embodiments may project different content on a screen in an airport, train station, bus terminal, or the like, which provides different specific information such as gate information, directions, schedules, security guidelines, security line wait times, delays, cancellations, and the like. At malls or other shopping venues, illustrative embodiments can project on a screen different content regarding services, products, and the like. Furthermore, illustrative embodiments can project on a screen the same content in several different languages. For example, one content slot may display the content in English, a next content slot may display the content in Spanish, a next content slot may display the content in French, and so on. As a result, viewers may stand at a particular viewing angle to see the content in a desired language.

Thus, illustrative embodiments provide one or more technical solutions that overcome a technical problem with providing personalized dynamic displays capable of simultaneously displaying full color content images to each of a plurality of viewers using diffraction grating technology. As a result, these one or more technical solutions provide a technical effect and practical application in the field of diffraction grating.

With reference now to FIG. 3, a diagram illustrating an example of a display device is depicted in accordance with an illustrative embodiment. Display device 300 may be implemented in a network of data processing systems, such as network data processing system 100 in FIG. 1, and may be, for example, display device 112 in FIG. 1.

In this example, display device 300 includes 3 separate projectors, projector 302, projector 304, and projector 306. Projector 302, projector 304, and projector 306 may be, for example, projectors 134 in FIG. 1. However, it should be noted that display device 300 is intended as an example only and not as a limitation on different illustrative embodiments. In other words, display device 300 may include any number of projectors, such as 4, 5, 10, 20, or the like. Also, it should be noted that 3 image projectors are a minimum number of image projectors for illustrative embodiments.

Display device 300 also includes diffraction grating 308, diffraction grating 310, and diffraction grating 312. Diffraction grating 308, diffraction grating 310, and diffraction grating 312 may be, for example, diffraction gratings 136 in FIG. 1. It should be noted that projector 302, projector 304, and projector 306 correspond to diffraction grating 308, diffraction grating 310, and diffraction grating 312, respectively.

Diffraction grating 308, diffraction grating 310, and diffraction grating 312 each splits light projected by projector 302, projector 304, and projector 306 into component wavelengths, isolating each light wavelength to a certain viewing angle (i.e., different light wavelengths (e.g., colors) are only viewable at certain viewing angles). Consequently, display device 300 enables display of multiple different content images in full color at different viewing angles. Further, assume an optimal diffraction grating for each respective projector to achieve 3 colors (i.e., red, green, and blue colors) at each respective viewing angle, such as viewing angle A 314, viewing angle B 316, viewing angle C 318, viewing angle C 320, viewing angle B 322, and viewing angle A 324. It should be noted that display device 300 will display the same full color content image (e.g., "content A") at viewing angle A 316 and viewing angle A 324 on display panel 326. Similarly, display device 300 will display the same full color content image (e.g., "content B") at viewing angle B 316 and viewing angle B 322 and display the same full color content image (e.g., "content C") at viewing angle C 318 and viewing angle C 324. However, it should be noted that each of content A, content B, and content C comprises a different content image payload. As a result, display device 300 enables viewers to receive specific full color content images via dynamic viewing display area 326 based on viewing angle.

Illustrative embodiments do not limit the number of viewers due to the number of projectors. Illustrative embodiments utilize a display device with a large display panel or screen comprising a multitude of image projectors, in which a multitude of corresponding content slots of the large display panel can display a specific content image in red, green, and blue colors to deliver a full color image to a given viewer at a given viewing angle relative to display device 300. In other words, illustrative embodiments logically divide dynamic viewing display area 326 into a multitude of content slots comprising personalized dynamic displays, which correspond to the different viewing angles, to deliver red, green, and blue color light to each respective viewer no matter the viewing angle. Thus, the only limitation on the number of viewers who can receive full color content images is based on the periodicity of the diffraction gratings, which determines the period width of the color spectrum projected.

Figure 4:
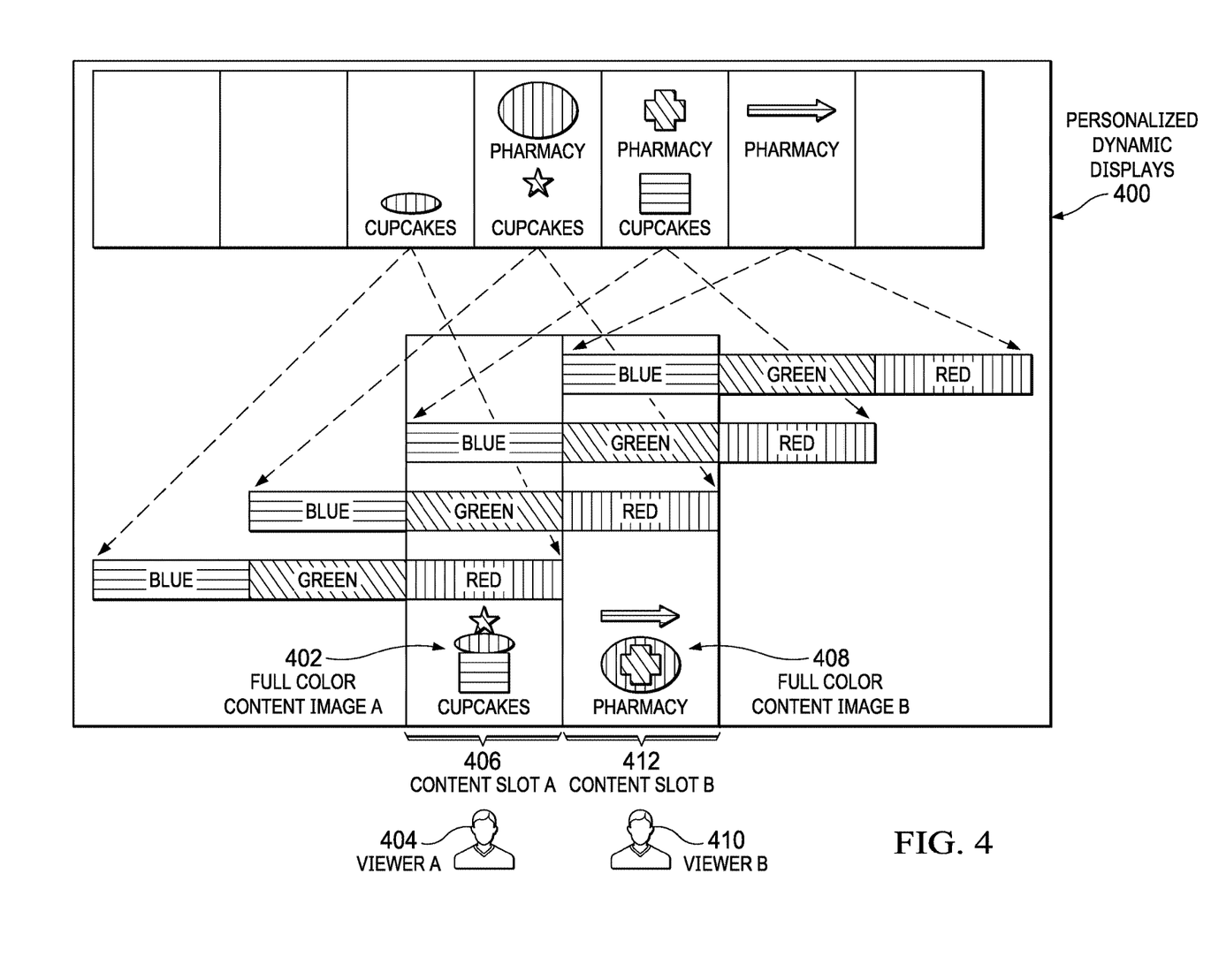
FIG. 4 is a diagram illustrating an example of personalized dynamic displays in accordance with an illustrative embodiment.

With reference now to FIG. 4, a diagram illustrating an example of personalized dynamic displays is depicted in accordance with an illustrative embodiment. Personalized dynamic displays 400 may be projected in a dynamic viewing display area by a display device, such as, for example, dynamic viewing display area 326 corresponding to display device 300 in FIG. 3.

In this example, personalized dynamic displays 400 display full color content image A 402 to viewer A 404 via content slot A 406 based on the viewing angle of viewer A 404 relative to the display device. In addition, personalized dynamic displays 400 simultaneously display full color content image B 408 to viewer B 410 via content slot B 412 based on the viewing angle of viewer B 408 relative to the display device.

Figure 5:
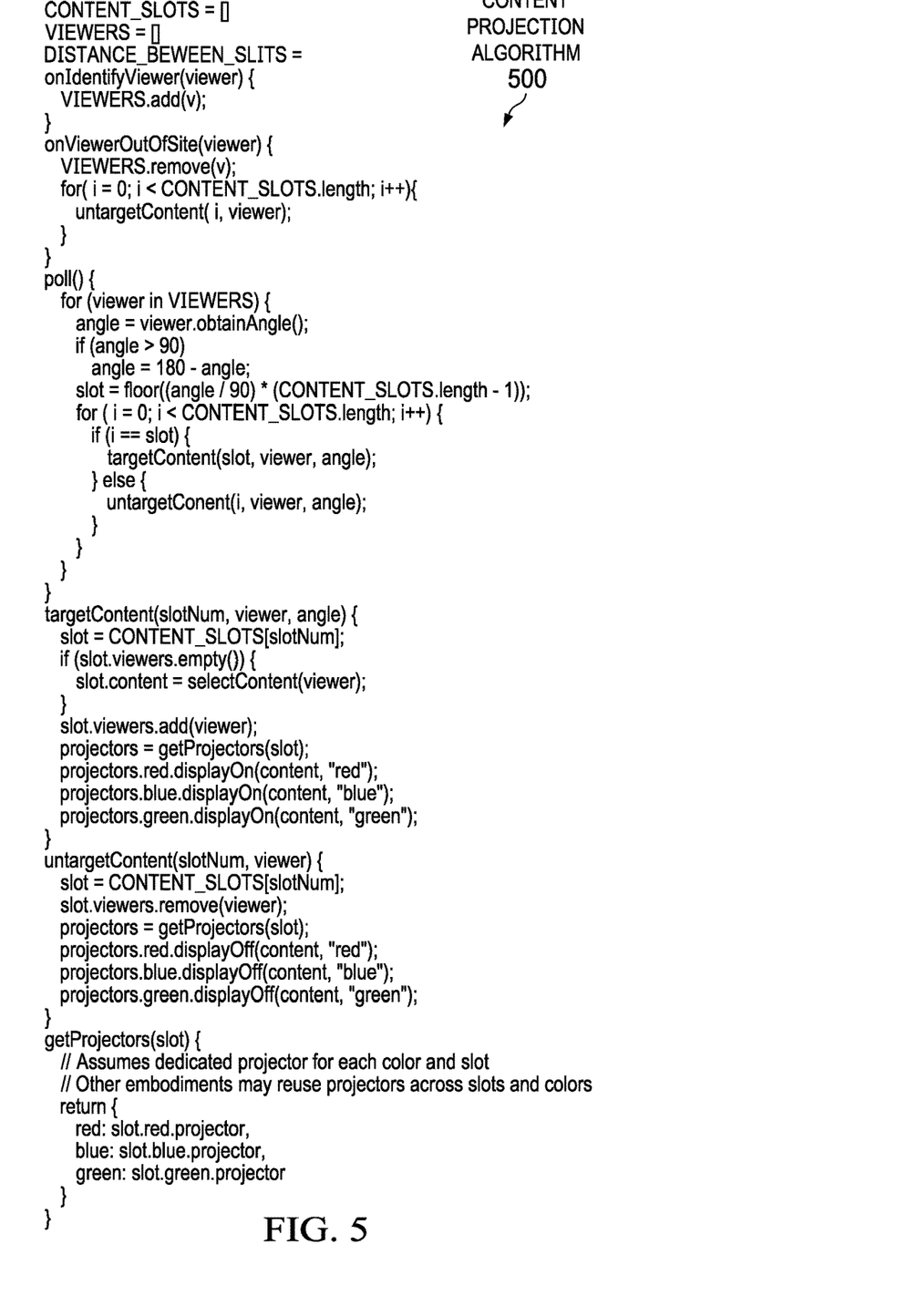
FIG. 5 is a diagram illustrating an example of a content projection algorithm in accordance with an illustrative embodiment.

With reference now to FIG. 5, a diagram illustrating an example of a content projection algorithm is depicted in accordance with an illustrative embodiment. Content projection algorithm 500 may be implemented in a content projection manager, such as, for example, content projection manager 218 of data processing system 200 in FIG. 2.

Content projection algorithm 500 defines the number of content slots (e.g., 2 content slots, 3 content slots, 4 content slots, and the like) for a dynamic viewing display area and tracks the number of viewers and their corresponding viewing angle relative to a display device. The display device may be, for example, display device 300 in FIG. 3. Content projection algorithm 500 may utilize information received from, for example, a set of sensors, such as cameras, motion detectors, and the like, in a particular area to track viewers and their respective locations relative to the display device. The set of sensors in the particular area may be, for example, sensors 110 in area 122 of FIG. 1. Content projection algorithm 500 then determines content selection for each respective content slot based on viewing angles of respective viewers relative to the display device and also determines which projector in a plurality of projectors of the display device is to project which color to which content slot to provide specific full color content images to each respective viewer.

Figure 6A:
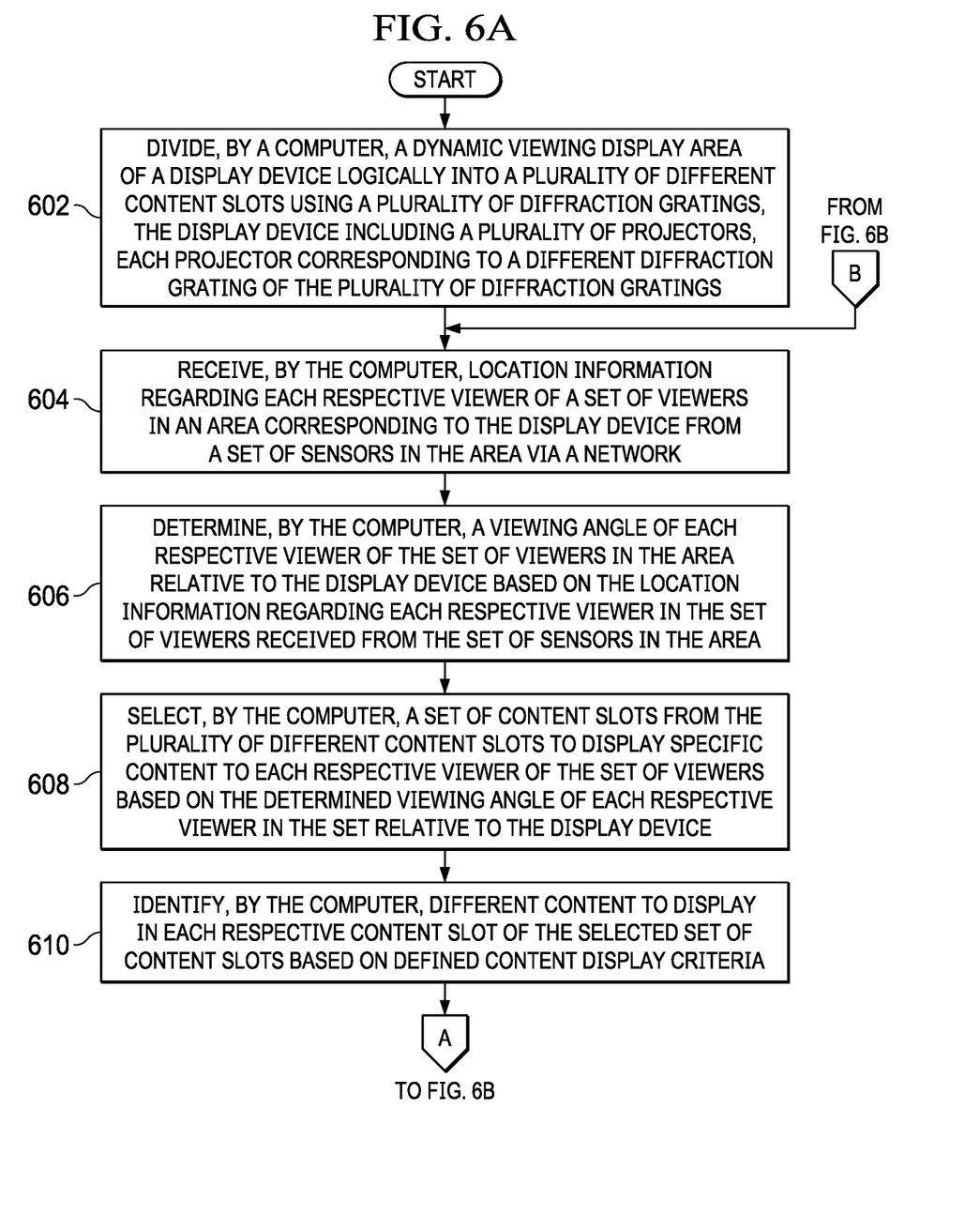
FIGS. 6A-6B are a flowchart illustrating a process for simultaneous content targeting to multiple viewers using a display device with multiple projectors and diffraction gratings in accordance with an illustrative embodiment.
Figure 6B:
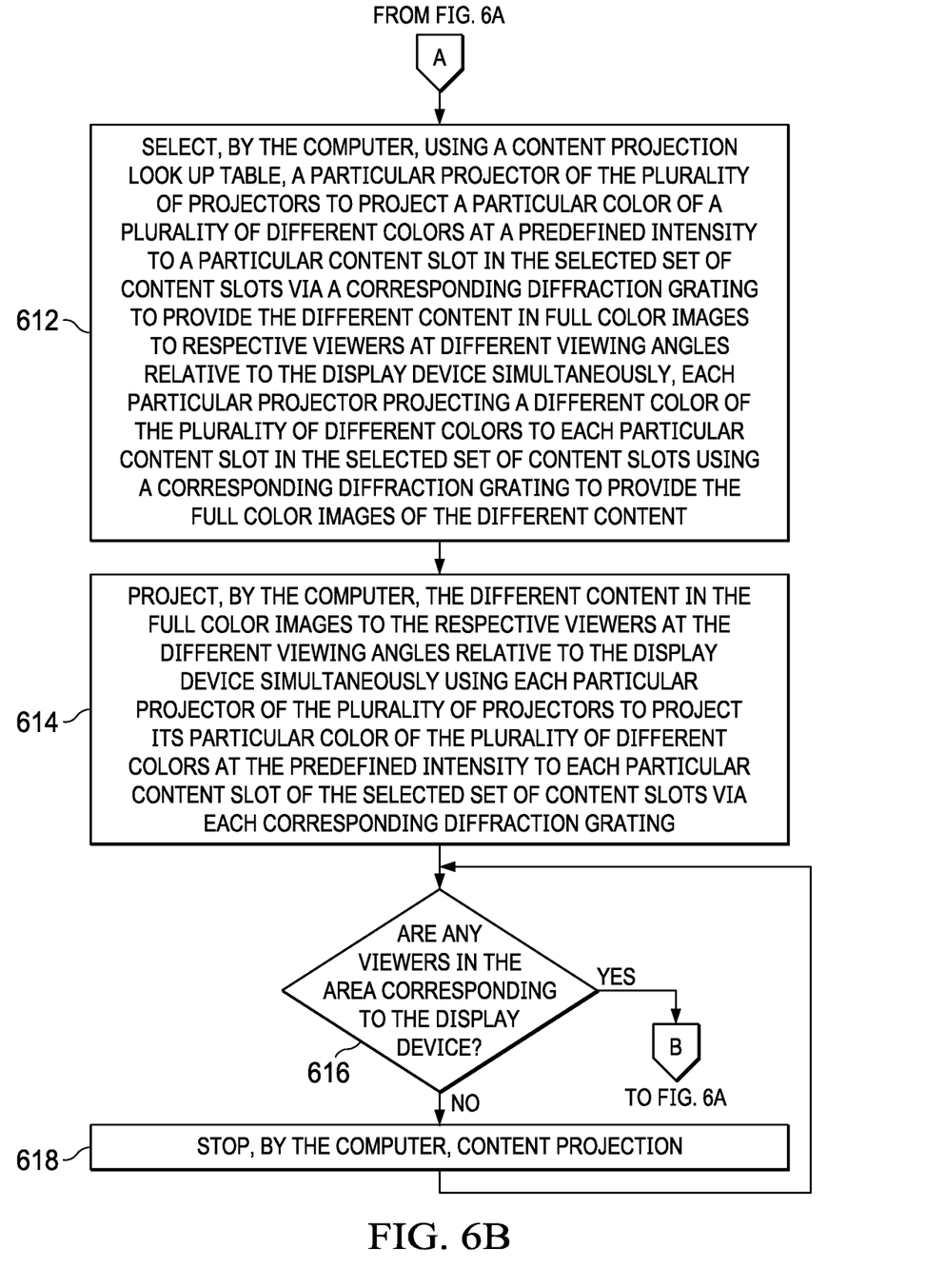

With reference now to FIGS. 6A-6B, a flowchart illustrating a process for simultaneous content targeting to multiple viewers using a display device with multiple projectors and diffraction gratings is shown in accordance with an illustrative embodiment. The process shown in FIGS. 6A-6B may be implemented in a computer, such as, for example, server 104 in FIG. 1 or data processing system 200 in FIG. 2. For example, the process shown in FIGS. 6A-6B may be implemented in content projection manager 218 in FIG. 2.

The process begins when the computer logically divides a dynamic viewing display area of a display device into a plurality of different content slots using a plurality of diffraction gratings (step 602). The display device including a plurality of projectors. Each projector of the plurality of projectors corresponds to a different diffraction grating of the plurality of diffraction gratings.

The computer receives location information regarding each respective viewer of a set of viewers in an area corresponding to the display device from a set of sensors in the area via a network (step 604). The set of viewers may be one or more viewers in the area. Similarly, the set of sensors may be one or more sensors in the area. The computer determines a viewing angle of each respective viewer of the set of viewers in the area relative to the display device based on the location information regarding each respective viewer in the set of viewers received from the set of sensors in the area (step 606).

The computer selects a set of content slots from the plurality of different content slots to display specific content to each respective viewer of the set of viewers based on the determined viewing angle of each respective viewer in the set of viewers relative to the display device (step 608). The selected set of content slots may be one or more content slots of the plurality of different content slots. In other words, the selected set of content slots may be a portion or all of the plurality of different content slots depending on determined viewing angles of each respective viewer in the set of viewers relative to the display device.

The computer identifies different content to display in each respective content slot of the selected set of content slots based on defined content display criteria (step 610). The defined content display criteria may be, for example, viewer-centric criteria based on viewer identity and profile, content-centric criteria, location-centric criteria, environment-centric criteria, navigation-centric criteria, language-centric criteria, or any combination thereof. The computer, using a content projection lookup table, selects a particular projector of the plurality of projectors to project a particular color of a plurality of different colors at a predefined intensity to a particular content slot in the selected set of content slots via a corresponding diffraction grating to provide the different content in full color images to respective viewers at different viewing angles relative to the display device simultaneously (step 612). Each particular projector of the plurality of projectors projects a different color of the plurality of different colors to each particular content slot in the selected set of content slots via a corresponding diffraction grating to provide the full color images of the different content. In other words, within each particular content slot, the plurality of projectors direct different colors to different viewers via corresponding diffraction gratings. The plurality of colors includes a red color, a green color, and a blue color.

The computer projects the different content in the full color images to the respective viewers at the different viewing angles relative to the display device simultaneously using each particular projector of the plurality of projectors to project its particular color of the plurality of different colors at the predefined intensity to each particular content slot of the selected set of content slots via each corresponding diffraction grating (step 614). The computer makes a determination as to whether any viewers are detected in the area corresponding to the display device using the set of sensors in the area (step 616). If the computer determines that one or more viewers are detected in the area corresponding to the display device, yes output of step 616, then the process returns to step 604 where the computer receives location information regarding the one or more viewers. If the computer determines that no viewers are detected in the area corresponding to the display device, no output of step 616, then the computer stops content projection (step 618). Thereafter, the process returns to step 616 where the computer determines whether any viewers are detected in the area corresponding to the display device.

Thus, illustrative embodiments of the present invention provide a computer-implemented method, computer system, and computer program product for simultaneously projecting targeted content to a plurality of different viewers at a plurality of different viewing angles relative to a display device comprising a plurality of projectors and a plurality of corresponding diffraction gratings. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for multiple projector-enabled content targeting using diffraction grating, the computer-implemented method comprising:

selecting, by a computer, a particular projector of a plurality of projectors in a display device to project a particular color of a plurality of different colors at a predefined intensity to a particular content slot in a selected set of content slots via a corresponding diffraction grating to provide different content in full color images to respective viewers of a set of viewers at different viewing angles relative to the display device simultaneously; and projecting, by the computer, the different content in the full color images to the respective viewers at the different viewing angles simultaneously using each particular projector of the plurality of projectors to project its particular color of the plurality of different colors at the predefined intensity to each particular content slot of the selected set of content slots via each corresponding diffraction grating.

2. The computer-implemented method of claim 1 further comprising:

dividing, by the computer, a dynamic viewing display area of the display device into a plurality of different content slots logically using a plurality of diffraction gratings, wherein each projector of the plurality of projectors corresponds to a different diffraction grating of the plurality of diffraction gratings.

3. The computer-implemented method of claim 1 further comprising:

receiving, by the computer, location information regarding each respective viewer of the set of viewers in an area corresponding to the display device from a set of sensors in the area via a network; and determining, by the computer, a viewing angle of each respective viewer of the set of viewers in the area relative to the display device based on the location information regarding each respective viewer in the set of viewers received from the set of sensors in the area.

4. The computer-implemented method of claim 3 further comprising:

selecting, by the computer, a set of content slots from a plurality of different content slots to form the selected set of content slots to display specific content to each respective viewer of the set of viewers based on the determined viewing angle of each respective viewer in the set of viewers relative to the display device.

5. The computer-implemented method of claim 1 further comprising:

identifying, by the computer, different content to display in each respective content slot of the selected set of content slots based on defined content display criteria.

6. The computer-implemented method of claim 1, wherein each particular projector of the plurality of projectors projects a different color of the plurality of different colors at the predefined intensity to each particular content slot in the selected set of content slots via the corresponding diffraction grating to provide the full color images of the different content.

7. The computer-implemented method of claim 1, wherein the plurality of different colors includes a red color, a green color, and a blue color.

8. The computer-implemented method of claim 1, wherein the plurality of projectors includes three projectors.

9. A computer system for multiple projector-enabled content targeting using diffraction grating, the computer system comprising:

a bus system;

a storage device connected to the bus system, wherein the storage device stores program instructions; and a processor connected to the bus system, wherein the processor executes the program instructions to:

select a particular projector of a plurality of projectors in a display device to project a particular color of a plurality of different colors at a predefined intensity to a particular content slot in a selected set of content slots via a corresponding diffraction grating to provide different content in full color images to respective viewers of a set of viewers at different viewing angles relative to the display device simultaneously; and project the different content in the full color images to the respective viewers at the different viewing angles simultaneously using each particular projector of the plurality of projectors to project its particular color of the plurality of different colors at the predefined intensity to each particular content slot of the selected set of content slots via each corresponding diffraction grating.

10. The computer system of claim 9, wherein the processor further executes the program instructions to:

divide a dynamic viewing display area of the display device into a plurality of different content slots logically using a plurality of diffraction gratings, wherein each projector of the plurality of projectors corresponds to a different diffraction grating of the plurality of diffraction gratings.

11. The computer system of claim 9, wherein the processor further executes the program instructions to:

receive location information regarding each respective viewer of the set of viewers in an area corresponding to the display device from a set of sensors in the area via a network; and determine a viewing angle of each respective viewer of the set of viewers in the area relative to the display device based on the location information regarding each respective viewer in the set of viewers received from the set of sensors in the area.

12. The computer system of claim 11, wherein the processor further executes the program instructions to:

select a set of content slots from a plurality of different content slots to form the selected set of content slots to display specific content to each respective viewer of the set of viewers based on the determined viewing angle of each respective viewer in the set of viewers relative to the display device.

13. The computer system of claim 9, wherein the processor further executes the program instructions to:

identify different content to display in each respective content slot of the selected set of content slots based on defined content display criteria.

14. The computer system of claim 9, wherein each particular projector of the plurality of projectors projects a different color of the plurality of different colors at the predefined intensity to each particular content slot in the selected set of content slots via the corresponding diffraction grating to provide the full color images of the different content.

15. A computer program product for multiple projector-enabled content targeting using diffraction grating, the computer program product comprising a computer readable storage medium having program instructions embodied therewith, the program instructions executable by a computer to cause the computer to perform a method of:
selecting, by the computer, a particular projector of a plurality of projectors in a display device to project a particular color of a plurality of different colors at a predefined intensity to a particular content slot in a selected set of content slots via a corresponding diffraction grating to provide different content in full color images to respective viewers of a set of viewers at different viewing angles relative to the display device simultaneously; and
projecting, by the computer, the different content in the full color images to the respective viewers at the different viewing angles simultaneously using each particular projector of the plurality of projectors to project its particular color of the plurality of different colors at the predefined intensity to each particular content slot of the selected set of content slots via each corresponding diffraction grating.

16. The computer program product of claim 15 further comprising:
dividing, by the computer, a dynamic viewing display area of the display device into a plurality of different content slots logically using a plurality of diffraction gratings, wherein each projector of the plurality of projectors corresponds to a different diffraction grating of the plurality of diffraction gratings.

17. The computer program product of claim 15 further comprising:
receiving, by the computer, location information regarding each respective viewer of the set of viewers in an area corresponding to the display device from a set of sensors in the area via a network; and
determining, by the computer, a viewing angle of each respective viewer of the set of viewers in the area relative to the display device based on the location information regarding each respective viewer in the set of viewers received from the set of sensors in the area.

18. The computer program product of claim 17 further comprising:
selecting, by the computer, a set of content slots from a plurality of different content slots to form the selected set of content slots to display specific content to each respective viewer of the set of viewers based on the determined viewing angle of each respective viewer in the set of viewers relative to the display device.

19. The computer program product of claim 15 further comprising:
identifying, by the computer, different content to display in each respective content slot of the selected set of content slots based on defined content display criteria.

20. The computer program product of claim 15, wherein each particular projector of the plurality of projectors projects a different color of the plurality of different colors at the predefined intensity to each particular content slot in the selected set of content slots via the corresponding diffraction grating to provide the full color images of the different content.

* * * * *